May 30, 1933.  G. D. PEET  1,912,334
METHOD AND APPARATUS FOR TREATING WATER
Filed May 29, 1929

INVENTOR.
Gerald D. Peet
BY Arthur L. Kent
his ATTORNEY.

Patented May 30, 1933

1,912,334

UNITED STATES PATENT OFFICE

GERALD D. PEET, OF MONTCLAIR, NEW JERSEY, ASSIGNOR TO WALLACE & TIERNAN COMPANY, INC., OF BELLEVILLE, NEW JERSEY, A CORPORATION OF NEW YORK

METHOD AND APPARATUS FOR TREATING WATER

Application filed May 29, 1929. Serial No. 366,893.

This invention relates to a method and apparatus for antisepticizing flowing water. The invention relates more especially to the treatment of water by means of chlorin gas which is added to the water in relatively minute proportionate amounts and must be quickly dissolved and distributed through the body of water to be treated, as is well understood. The invention comprises a method wherein a minor flow of water is established through a chlorin-resistant closed by-pass passage connected between separated points in the main flow of water to be treated, and a flow of water through the by-pass passage is caused by producing a loss in pressure in the main flow between such separated points, and chlorin gas is introduced into the minor flow of water at a point sufficiently distant from the point where the minor flow is returned to the main flow to cause the chlorin to be dissolved in the minor flow before it again joins the main flow. The invention also comprises apparatus for carrying out the method.

Two methods are in general use for treating flowing water with gaseous chlorin. According to one of these methods the chlorin gas is introduced directly as a gas into the flowing water to be treated. This requires the use of a submerged diffuser for promoting the solution of the chlorin in the water. These diffusers are a source of great trouble due to the formation of chlorin hydrate within the diffuser and resulting damage to the diffuser. Also, the use of this method often results in serious corrosion of the water mains due to undissolved chlorin becoming pocketed against corrodible material.

The other method involves the establishment of a separate minor flow of water, introducing chlorin gas into this minor flow in such a manner that it becomes dissolved therein, and then discharging the minor flow of water into the main flow of water to be treated. In this method, the minor flow of water must be under sufficient pressure to effect its introduction into the main flow of water. To secure this sufficient pressure for forcing the chlorinated minor flow into the main flow when the latter is under pressure in a closed conduit has heretofore required the use of a pump for creating the necessary pressure in the minor flow, or the utilization of a sufficient gravity head on the minor flow, which is seldom available. If the water for the minor flow is taken from the main flow of water to be treated, a pump is used to step up the pressure even when the main flow is a gravity flow in an open conduit or channel. The cost of providing this minor flow under pressure leads to the use of a minimum amount of water in the minor flow, and, this, because of the relatively high concentration of chlorin in the chlorinated small minor flow, results in hydrate trouble. In cold climates, because of operating difficulties due to the formation of hydrate, it is necessary and customary to heat the room in which the chlorinator is installed. Furthermore, this minor flow method as heretofore practiced is not applicable in many cases where a minor flow under the necessary pressure is not available from a gravity source and electric current for an electrically driven pump is not available and it is not feasible to use a gasoline driven pump or other pump requiring the regular attendance of an operator.

The object of the present invention is to provide a method and apparatus for treating flowing water with chlorin gas which shall have the advantages of both of the above methods and shall be without the disadvantages or difficulties attendant upon the use of either.

According to the present invention, the chlorin gas in a controlled and pre-determined amount is introduced into a minor flow of water diverted from the main flow of water to be treated through a by-pass passage, the flow through the by-pass passage being caused by a difference in pressure between separated points in the main flow produced by a restriction or other flow-obstructing means which causes a drop in pressure in the main flow. The by-pass passage has its intake end connected to the main flow conduit on the up-stream side of the obstruction and its discharge end on the down-stream side of the obstruction. The by-pass passage is a closed passage made chlorin-resistant, usually a pipe or tube of chlorin-resistant material such as hard rubber, rubber hose, earthenware, or glass. Chlorin gas is introduced at a pre-determined and usually measured rate into the minor flow at a point in the by-pass passage sufficiently removed from the discharge end of the passage to cause the chlorin to be absorbed in the minor flow before the minor flow is discharged into the main flow. All danger of corrosion of the main flow conduit is thus avoided.

Any suitable apparatus may be used for supplying the chlorin gas to the by-pass passage, and the gas may be drawn from any suitable source, such as a tank or container of liquefied chlorin. The gas must, of course, be introduced into the passage under pressure sufficiently greater than the pressure of the minor flow of water at the point of introduction. The pressure in the by-pass passage will depend on the pressure in the main flow and the arrangement of the by-pass passage. If the pressure at which the chlorin reaches the point of introduction is not sufficiently high to overcome the water pressure, the supply pressure of the chlorin may be increased to the desired extent by applying heat to the tank of liquefied chlorin from which the gas is drawn. Most desirably, however, if the pressure in the by-pass passage would otherwise be greater than that desired for introduction of the chlorin gas at the available gas pressure, the by-pass passage is extended upward to a level at which the pressure is sufficiently below the chlorin gas supply pressure.

Whether the main flow of water to be treated is through a closed conduit and under a considerable pressure, or through an open conduit, or channel, the drop in pressure between the intake and discharge ends of the by-pass passage may be, and usually is, small, only sufficient drop in pressure being required to overcome friction and give the necessary minor flow through the passage. This results from the use of a closed by-pass passage, whereby the pressure energy of the water at the intake end of the passage is not lost but is available at the discharge end of the passage. A comparatively small pressure difference developed by a pressure-reducing obstruction in the main flow is sufficient, therefore, to maintain the minor flow, and there is no need to limit the amount of water in the minor flow. On the contrary, the minor flow may without any undue cost be of such volume that the chlorin concentration therein will be so low as to avoid hydrate trouble. A small pressure difference produced in the main flow will obviously produce a comparatively rapid flow through the by-pass passage, and because of the resulting mixture of the introduced chlorine gas with the minor flow water the gas will be quickly dissolved.

It is not necessary to provide an enlargement or chamber in the by-pass passage at the place of introduction of the chlorin, but, on the contrary, the by-pass is most desirably a passage of substantially uniform cross-area so that the full flow rate or speed of the minor flow is maintained at the point of introduction of the chlorin gas. This is not, however, in all cases necessary, and the invention in its broader aspect is not to be limited to the use of a by-pass passage formed so as to maintain the full flow speed of the minor flow at the point of introduction of the chlorin gas.

The accompanying drawing shows more or less diagrammatically illustrative apparatus for practicing the method and embodying the apparatus features of the invention. In said drawing:—

Figure 1:
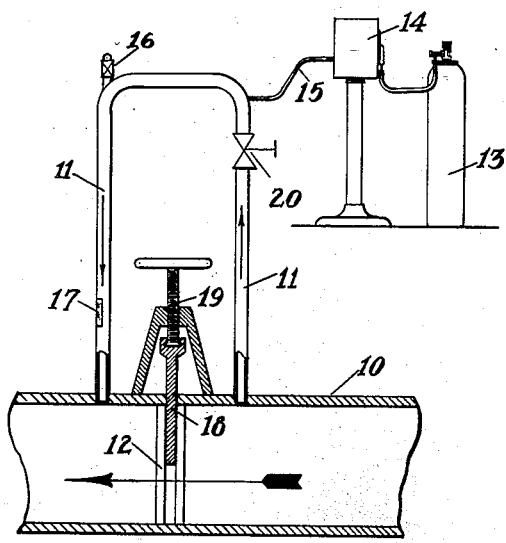
Fig. 1 illustrates diagrammatically and partly in section an application of the invention to a closed conduit through which water to be treated flows under pressure.

Referring first to Fig. 1, in the apparatus here shown the main flow of water to be treated is through a closed conduit 10, and the by-pass passage is provided by a pipe 11 of chlorin-resistant material the ends of which are connected to the conduit 10 at points spaced longitudinally thereof. Between the points of connection of the ends of the pipe there is a pressure-reducing restriction 12 in the conduit. The difference in pressure in the main flow through the conduit between the intake end of the pipe 11 above the restriction and the discharge end beyond the restriction causes water to flow through the by-pass passage. This minor flow, being caused by a loss of pressure in the main flow, is in the same general direction as the main flow. The by-pass passage being a closed passage, the pressure energy of the water entering the passage from the main flow is substantially all available at the discharge end of the passage and serves to force the chlorinated minor flow into the main flow, this being so whatever the pressure of the main flow.

Chlorin gas from a suitable source of supply, such as a tank 13 of liquid chlorin is supplied at a predetermined rate by control apparatus 14 and introduced into the by-pass passage through a tube 15. The control apparatus may be of any suitable kind. The tube 15 connects to the by-pass pipe 11 at a point far enough from the discharge end so that the chlorin will be absorbed in the water flowing through the pipe 11 before this minor flow is discharged into the main flow conduit. In installations where there may at times occur a condition of reversed flow through the main flow conduit, the chlorin supply tube 15 should connect to the by-pass pipe at a point sufficiently distant from either end of the pipe to give complete absorption of the chlorin before the minor flow is discharged into the main flow regardless of the direction of the main flow. The by-pass passage is most desirably of uniform cross-area as indicated by the drawing, or substantially so.

As shown in Fig. 1, the pipe 11 extends upward from the conduit 10, and the chlorin supply tube is connected at a high point of the pipe. The pressure of the minor flow at the point of introduction of the chlorin gas will thus be less than the main flow pressure by an amount dependent on the distance the pipes rises. By extending the pipe upward a suitable distance above the conduit, the minor flow pressure at the point of chlorin introduction may thus be reduced to a pressure below the gas supply pressure in cases where the pressure in the main flow is so high that the minor flow pressure would otherwise be too high to permit the gas to enter. The necessity of heating the liquid chlorin to increase the gas supply pressure is thus avoided.

When the by-pass passage is extended upward, the water flowing through it should have sufficient velocity to scour out any air or insoluble gas which might otherwise collect at the high point. A manually operated blow-off valve may, if desired, be provided at the high point of the passage, or there may be provided an automatic gas relief valve of the type used at high points of water mains to permit the escape of air and other undissolved gases without permitting the escape of water. Such a relief valve is indicated in Fig. 1 at 16. The automatic relief valve or blow-off should be located sufficiently beyond the point of connection of the gas supply tube 15 so that the chlorin will be practically all dissolved before reaching the relief valve.

A comparatively small drop in pressure is sufficient to maintain the desired minor flow through the by-pass passage, and the required drop in pressure past the restriction in the main flow conduit is correspondingly small since it need be only enough to cause a sufficient minor flow of the desired velocity through the by-pass passage. Where it is desired to maintain the drop in pressure in the main flow at a minimum, a sight glass 17 may be provided in the pipe 11 adjacent its discharge end to enable the operator to see whether or not all of the chlorin supplied to the minor flow is dissolved before the minor flow re-enters the main flow, and the restriction 12 may be made adjustable as by means of a sliding gate 18 movable in or out by means of a hand-operated screw 19. The restriction may be thus adjusted to produce just sufficient minor flow to absorb all of the chlorin.

In some cases where the by-passage is of limited length and the drop in pressure in the main flow is relatively great, it is desirable to provide a control valve 20 or other adjustable restriction in the by-passage for reducing and regulating the flow through the by-passage to a rate such that undissolved chlorin will not be carried into the main flow.

Figure 2:
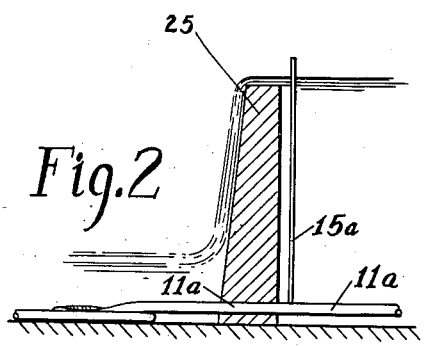
Fig. 2 shows the use of the invention for chlorinating water flowing through an open channel and over a weir.

Fig. 2 illustrates an application of the invention for chlorinating water flowing through an open conduit or channel. As here shown, pressure difference produced by a weir 25 is utilized for maintaining a minor flow through a by-pass passage provided by a pipe 11a which extends from a point of relatively high pressure in the main flow of water on the up-stream side of, or above, the weir to a point of relatively low pressure beyond the weir, and the chlorin gas is introduced into the minor flow through a supply tube 15a. When the main flow is not under pressure, the by-pass passage should be throughout its length below the minimum hydraulic gradient so that the minor flow shall at all points be under at least slight pressure. The by-passage may extend outside the main flow channel, but is conveniently formed by a pipe laid in the channel and extending through the weir as shown in this figure.

Figure 3:
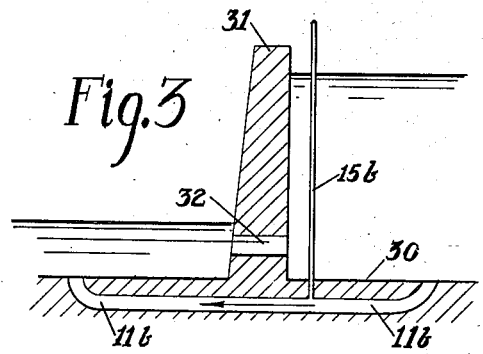
Fig. 3 shows an application of the invention in connection with a dam in an open conduit or channel.

In the installation illustrated in Fig. 3, the by-pass passage 11b extends outside the main flow channel through the masonry bottom 30 of the channel from the up-stream side to the down-stream side of a dam 31 provided with a flow orifice 32. Chlorin gas is supplied to the minor flow in the passage 11b by a supply tube 15b.

Figure 4:
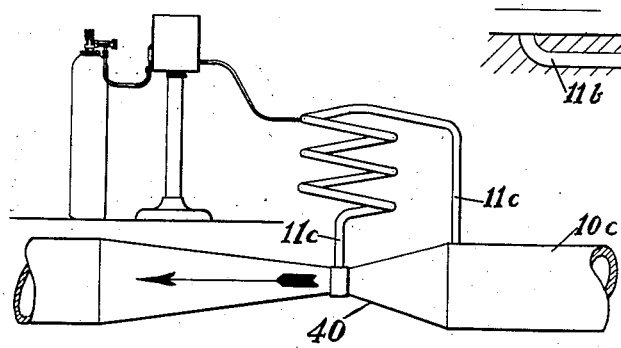
Fig. 4 shows an apparatus in which the by-pass is connected to a closed conduit provided with a Venturi tube.

In Fig. 4, the main flow of water is through a closed conduit 10c provided with a Venturi tube 40, and the pressure difference developed in the main flow by the Venturi tube is utilized for maintaining the minor flow through a pipe 11c, the intake end of the pipe being connected to the conduit at a point of relatively high pressure and the discharge end of the pipe being connected at or adjacent to the throat of the Venturi tube. By using a Venturi tube as the pressure reducing restriction in the conduit, the desired pressure reduction is obtained with practically no loss of pressure energy since practically all the loss of head through the restricted throat of the Venturi tube is recovered.

It will be seen that the invention eliminates trouble from formation of chlorin hydrate, danger of corrosion of water mains, difficulty from breaking of diffusers, and necessity of using pumps and providing costly attendance. Especially in the sterilization of sewage, where the minor flow must because of the dosage be comparatively large, the saving in operating cost for water and power is very great, since a minor flow of relatively clear water is not required, but the minor flow may consist of raw sewage diverted through the by-passage.

The term "water" as used herein is to be understood as including sewage and other watery, or water-containing, liquids.

What I claim is:

1. The method of sterilizing flowing water, which comprises causing a drop in pressure between separated points in the main flow of water to be treated by means of an obstruction in the main flow, utilizing a pressure difference resulting from such loss of pressure to cause a minor portion of the water of the main flow to flow through a chlorin-resistant closed by-pass passage with sufficient velocity to scour out insoluble gas and quickly dissolve chlorin gas, and introducing chlorin gas in controlled amount into the minor flow through such passage at a point sufficiently distant from the main flow to cause the chlorin to be dissolved in the minor flow before reaching the main flow.

2. The method of sterilizing flowing water, which comprises causing a minor portion of the water to be treated to flow with sufficient velocity to scour out insoluble gas and quickly dissolve chlorin gas through a chlorin-resistant closed by-pass passage by a pressure difference resulting from a drop in pressure by means of an obstruction in the main flow between the intake and discharge ends of the by-pass passage, and introducing chlorin gas in controlled amount into the minor flow through such passage at a point sufficiently distant from the main flow to cause the chlorin to be dissolved in the minor flow before reaching the main flow.

3. Apparatus for treating flowing water, comprising in combination with a closed conduit through which the water to be treated flows under pressure and which is provided with a restriction for causing a drop in pressure in the water, of means providing a closed by-pass passage extending from a point of relatively high pressure to a point of relatively low pressure in said conduit to cause a flow through the passage of sufficient velocity to scour out insoluble gas and quickly dissolve chlorin gas, and means for introducing chlorin gas in controlled amount into said by-pass passage at a point sufficiently distant from the discharge end of the passage for the gas to become dissolved in the water flowing through the passage before being discharged into the conduit.

4. Apparatus for treating flowing water, comprising in combination with a conduit through which the water to be treated flows, a closed by-pass passage extending between separated points in the conduit, an obstruction in the conduit between the points of connection of said passage for causing a drop in pressure in the main flow of water to produce in the by-pass passage a flow of sufficient velocity to scour out insoluble gas and quickly dissolve chlorin gas, and means for introducing chlorin gas in controlled amount into said by-pass passage at a point sufficiently distant from the discharge end of the passage for the gas to become dissolved in the water flowing through the passage before being discharged into the conduit.

5. Apparatus for treating water, comprising in combination with a closed conduit through which the water to be treated flows under pressure, of a chlorin-resistant closed by-pass passage extending between separated points in the conduit, a restriction in the conduit to cause a difference in pressure between said separated points to produce in the by-pass passage a flow of sufficient velocity to scour out insoluble gas and quickly dissolve chlorin gas, an adjustable restriction in said passage for regulating the rate of flow therethrough, and means for introducing chlorin gas in controlled amount into said passage at a point sufficiently distant from the discharge end of the passage for the gas to become dissolved in the water flowing through the passage before being discharged into the conduit.

6. Apparatus for treating flowing water, comprising in combination with a closed conduit through which the water to be treated flows under pressure and which is provided with a restriction for causing a drop in pressure in the water, of means providing a closed by-pass passage extending from a point of relatively high pressure to a point of relatively low pressure in said conduit to cause a flow through the passage of sufficient velocity to scour out insoluble gas and quickly dissolve chlorin gas, and means for introducing chlorin gas in controlled amount into said by-pass passage at a point sufficiently distant from the discharge end of the passage for the gas to become dissolved in the water flowing through the passage before being discharged into the conduit, the by-pass passage extending upward and the point of introduction of the chlorin gas being sufficiently above the conduit for the pressure within the passage to be substantially less than the pressure in the conduit and less than the gas supply pressure.

7. Apparatus for treating flowing water, comprising in combination with a closed conduit through which the water to be treated flows under pressure and which is provided with a Venturi tube for causing a drop in pressure in the water, of means providing a closed by-pass passage extending from a point of relatively high pressure to a point of relatively low pressure in said conduit to cause a flow through the passage of sufficient velocity to scour out insoluble gas and quickly dissolve chlorin gas, and means for introducing chlorin gas in controlled amount into said by-pass passage at a point sufficiently distant from the discharge end of the passage for the gas to become dissolved in the water flowing through the passage before being discharged into the conduit.

In testimony whereof I have hereunto set my hand.

GERALD D. PEET.